US008984117B2

(12) United States Patent
Kiss (10) Patent No.: US 8,984,117 B2
(45) Date of Patent: *Mar. 17, 2015

(54) SYSTEM AND METHOD FOR RE-PUBLICATION OF INFORMATION IN A NETWORK-BASED COMMUNICATION SYSTEM

(71) Applicant: Nokia Corporation, Espoo (FI)

(72) Inventor: Krisztian Kiss, San Francisco, CA (US)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 13/921,686

(22) Filed: Jun. 19, 2013

(65) Prior Publication Data

US 2013/0282888 A1 Oct. 24, 2013

Related U.S. Application Data

(63) Continuation of application No. 12/576,765, filed on Oct. 9, 2009, now Pat. No. 8,504,608.

(60) Provisional application No. 61/104,667, filed on Oct. 10, 2008.

(51) Int. Cl.
*G06F 15/16* (2006.01)
*G06F 15/173* (2006.01)
(Continued)

(52) U.S. Cl.
CPC ............... *H04L 41/00* (2013.01); *H04L 67/24* (2013.01)
USPC ............................ 709/223; 709/202; 379/235

(58) Field of Classification Search
CPC ..... H04L 41/00; H04L 67/24; H04L 61/1529; H04L 29/06176; H04L 29/12094; H04L 29/12764

USPC .................................................. 709/202, 223
See application file for complete search history.

(56) References Cited

U.S. PATENT DOCUMENTS

2007/0168424 A1* 7/2007 Oh et al. ......................... 709/204
2007/0288621 A1* 12/2007 Gundu et al. .................. 709/223
(Continued)

FOREIGN PATENT DOCUMENTS

CN 101026618 A 8/2007
EP 1 821 488 A1 8/2007
(Continued)

OTHER PUBLICATIONS

Session Initiation Protocol (SIP) Extension for Event State Publication, RFC 3903, pp. 1-36, A. Niemi, Ed. Nokia, Oct. 2004, http://www.ietf.org/rfc/rfc3903.txt retrieved Sep. 19, 2013, pp. 1-32.

(Continued)

*Primary Examiner* — Tauqir Hussain
(74) *Attorney, Agent, or Firm* — Ditthavong & Steiner, P.C.

(57) ABSTRACT

Methods, devices, and computer program products facilitate communications between two or more network entities that utilize Session Initiation Protocol. To this end, an Event State Compositor may force an Event Publication Agent to provide update information as deemed necessary by the Event State Compositor. The update of the publication information may be carried out by initiating an update triggering mechanism that is addressed to the Event State Compositor and comprises information that specifically identifies a particular publication. Such a triggering mechanism may be initiated when a predefined condition associated with the Event State Compositor's local policies is satisfied.

20 Claims, 4 Drawing Sheets

(51) Int. Cl.
*H04L 12/24* (2006.01)
*H04L 29/08* (2006.01)

(56) References Cited

U.S. PATENT DOCUMENTS

| | | |
|---|---|---|
| 2008/0070543 A1* | 3/2008 | Matuszewski et al. .... 455/404.1 |
| 2008/0126541 A1* | 5/2008 | Rosenberg et al. ........... 709/225 |
| 2009/0010163 A1* | 1/2009 | Isomura et al. ............... 370/235 |
| 2009/0055532 A1 | 2/2009 | Oh et al. |
| 2009/0210536 A1* | 8/2009 | Allen et al. ................... 709/227 |
| 2010/0075673 A1* | 3/2010 | Colbert et al. ............. 455/435.1 |
| 2010/0198904 A1 | 8/2010 | Kiss |

FOREIGN PATENT DOCUMENTS

| | | |
|---|---|---|
| WO | 2007/066989 A1 | 6/2007 |
| WO | 2008/120901 A1 | 10/2008 |

OTHER PUBLICATIONS

Chinese Office Action with English language summary for related application No. 200980139816.X, dated Feb. 17, 2014, 6 pages.
Office Action for corresponding Chinese Application No. 200980139816.x, dated Sep. 2, 2014, with English language summary, 9 pages.
Sparks, "The Session Initiation Protocol (SIP) Refer Method", Request for Comments: 3515, Apr. 2003, 23 pages.

* cited by examiner

SYSTEM AND METHOD FOR RE-PUBLICATION OF INFORMATION IN A NETWORK-BASED COMMUNICATION SYSTEM

RELATED APPLICATIONS

This application is a continuation of U.S. application Ser. No. 12/576,765 filed Oct. 9, 2009 which claims priority to U.S. Provisional Application No. 61/104,667 filed on Oct. 10, 2008, which is incorporated herein by reference in its entirety.

FIELD OF INVENTION

The present invention relates generally to the enhancing the communication of information between various entities over a network. More particularly, the invention relates to methods, devices and computer program products for facilitating communications between two network entities that utilize a protocol such as, for example, Session Initiation Protocol.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The Session Initiation Protocol (SIP) is a signaling protocol, widely used for setting up and tearing down multimedia communication sessions such as voice and video calls over the Internet. Other application examples of SIP include video conferencing, streaming multimedia distribution, instant messaging, presence information, online games and others. The protocol can be used, for example, for creating, modifying and terminating two-party (unicast) or multiparty (multicast) sessions consisting of one or more media streams. The SIP protocol is designed to be independent of the underlying transport layer, and may be situated at the session layer in the Open System Interconnection (OSI) model, and at the application layer in the Transmission Control Protocol/Internet Protocol (TCP/IP) model. SIP has also been accepted as a 3rd Generation Partnership Project (3GPP) signaling protocol and a permanent element of the IP Multimedia Subsystem (IMS) architecture for IP-based streaming multimedia services in cellular systems.

SIP Requests are the codes used by SIP for communication. To complement these Requests, there are SIP Responses, which generally indicate whether a request has succeeded or failed, and in the latter case, why it has failed. SIP User Agents (UAs) are the end-user devices, used to create and manage a SIP session. A SIP UA has two main components, the User Agent Client (UAC), which sends messages and answers with SIP responses, and the User Agent Server (UAS), which responds to SIP requests sent by a peer. The SIP Events framework defines general mechanisms for subscription to, and notification of, Events within SIP networks. It defines a Package as a specific instantiation of the Events mechanism for specific events. For example, Packages have been defined for user Presence, Watcher information and other events.

According to SIP, Event State is defined as state information for a particular resource that is associated to the particular Event Package and an address-of-record. SIP further defines an Event Publication Agent (EPA) as the UAC that issues PUBLISH requests to publish event state, and an Event State Compositor (ESC), which is the UAS that processes PUBLISH requests and is responsible for compositing Event State into a complete, composite event state of a resource. The act of an EPA sending a PUBLISH request to an ESC to publish event state is referred to as Publication. PUBLISH allows SIP-compliant devices to publish Event State information, thus allowing them to publish any changes to the State information. SIP specifications further provide a mechanism for the EPA and the ESC to agree on an expiration interval that corresponds to the duration of validity of the published information. These and other details regarding SIP Event State Publication may be found, for example, in Session Initiation Protocol Extension for Event State Publication (RFC 3903). Although an EPA can publish event state information and may provide updates to previously published information, there is currently no mechanism to allow an ESC to force an EPA to provide such updates if such a need arises at an ESC. Failure to provide such an update mechanism, may interfere with proper and efficient operation of ESC and produce outdated information being provided to watchers monitoring the information.

SUMMARY OF THE INVENTION

The methods, apparatus and computer program products of the present invention enable an Event State Compositor (ESC) to force an Event Publication Agent (EPA) to provide update information as deemed necessary by the ESC. One aspect of the present invention relates to a method, comprising receiving an initial publication from an event publication agent at an event state compositor, the publication comprising an expiration interval, sending a republication request to trigger an updated publication to the event publication agent prior to expiration of the expiration interval, and receiving an updated information from the event publication agent in response to the republication request. In one embodiment, the initial publication comprises location information and the updated information comprises updated location information. In another embodiment, the initial publication information comprises a contact information associated with the event publication agent.

According to another embodiment of the present application, the contact information is located within at least one of a Contact header field or a Via header field. In a different embodiment, the Contact header field includes a Globally Routable User Agent URI as defined in draft-ietf-sip-gruu-15. In a different embodiment, the sending is triggered in accordance with a predefined condition. In yet another embodiment, the predefined condition comprises at least one of an addition of a new Watcher or a refreshing of a subscription of an existing Watcher. In accordance with another embodiment of the present application, the event publication agent is a presence source and the event state compositor is a presence server, while in a different embodiment, the republication request is carried out in accordance with a Session Internet Protocol (SIP) REFER request. In one variation, the REFER request comprises an entity tag for identification of a publication. In a different variation, a SIP-IF-Match header field comprises the entity tag. In a different embodiment, the event publication agent includes an Allow:REFER header field in initial publications. In yet a different embodiment, the updated information comprises at least one a refreshed, modified or removed information.

Another aspect of the present invention relates to a method, comprising sending an initial publication from an event publication agent to one or more event state compositors, the publication comprising an expiration interval, receiving a republication request from at least one event state compositor prior to expiration of the expiration interval, and sending an updated information to the event state compositor in response to the republication request. A different aspect of the present invention relates to a system, comprising sending an initial publication from an event publication agent to one or more event state compositors, the publication comprising an expiration interval, receiving the initial publication at an event state compositor, sending a republication request from the event state compositor to the event publication agent prior to expiration of the expiration interval, receiving the republication request at the event publication agent, sending an updated information to the event state compositor in response to the republication request, and receiving the updated information at the event state compositor.

In yet another aspect of the present invention, a computer program product, embodied on a computer readable medium, is provided, comprising a computer program for receiving an initial publication from an event publication agent at an event state compositor, the publication comprising an expiration interval, a computer program for sending a republication request to the event publication agent prior to expiration of the expiration interval, and a computer program for receiving an updated information from the event publication agent in response to the republication request. Another aspect of the present invention relates to a computer program product, embodied on a computer readable medium, comprising a computer program for sending an initial publication from an event publication agent to one or more event state compositors, the publication comprising an expiration interval, a computer program for receiving a republication request from at least one event state compositor prior to expiration of the expiration interval, and a computer program for sending an updated information to the event state compositor in response to the republication request.

Another aspect of the present invention relates to an apparatus, comprising a receiver configured to receive an initial publication from an event publication agent at an event state compositor, the publication comprising an expiration interval, and a transmitter configured to sent a republication request to the event publication agent prior to expiration of the expiration interval, wherein the receiver is further adapted to receive an updated information from the event publication agent in response to the republication request. Still, another aspect of the present invention is related to an apparatus, comprising a transmitter configured to send an initial publication from an event publication agent to one or more event state compositors, the publication comprising an expiration interval, and a receiver configured to receive a republication request from at least one event state compositor prior to expiration of the expiration interval, wherein the transmitter is further configured to send an updated information to the event state compositor in response to the republication request.

These and other advantages and features of various embodiments of the present invention, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions.

As an entity responsible for aggregating state information from potentially many sources, the ESC can be subject to considerable amounts of publication traffic. According to the SIP extension for event state publication, event state that is published by an EPA may have a defined lifetime and may expire after a specified amount of time. An EPA is responsible for refreshing its previously established publications before their expiration interval has elapsed. However, the expiration interval for publications may be negotiated between the EPA and the ESC. In a one scenario, if the EPA offers a shorter expiration interval than what the ESC local policy allows, the ESC may force the EPA to offer a higher value. This task may be accomplished, for example, by using the request/response header field identified as Min-Expires. The ability to negotiate the expiration time ensures that the average time between two consecutive publications is kept at a certain minimum level. Furthermore it allows the ESC to make sure that the refresh rate of publications do not cause an overload. In a second scenario, if the EPA offers a longer expiration interval than what the ESC local policy allows, the ESC may lower the suggested lifetime of the publication. However, in typical cases, the ESC simply accepts the EPA offered expiration value, allowing the information to expire as suggested by the EPA. As a result, the agreed upon expiration interval may be relatively long due to efforts to control the rate of publications.

In addition to a local policy for a minimum publication expiration time, the ESC may have another local policy containing conditions regarding when a particular type of information should be updated. An example of these additional considerations may be illustrated in terms of presence information. Presence information is a status indicator that conveys the ability and/or willingness of a potential communication partner, for example a user, to communicate with other entities in a network. A user's client provides presence information (e.g., presence state) via a network connection to a presence service, which is stored in what constitutes his personal availability record, also known as a presentity. The presentity can be made available for distribution to other users (called watchers) to convey its availability for communication. The Open Mobile Alliance (OMA), for example, has utilized implementations of the SIP protocol in the 3GPP IMS (IP Multimedia Subsystem) and 3GPP2 MMD (Multimedia Domain) for collecting and disseminating presence information between the various Presence Sources and their watchers. In considering the rate of publications, a Presence Server (i.e., an ESC) may have a condition to update the location information of the presentity every time a new Watcher subscribes, or whenever an existing Watcher refreshes its subscription. These and other additional conditions may thus affect the ESC's decision to negotiate an appropriate expiration interval with the EPA and/or require the receipt of update information at irregular times depending on whether or not a predefined condition is satisfied.

After an initial publication, the EPA has the complete responsibility to keep the information refreshed, modified with new values or removed before the information expires. A problem arises in the existing systems if the EPA fails to update the information at a regular interval and/or the ESC has a local policy that requires an update when a certain condition is met. According to an embodiment of the present invention, a mechanism may be developed to allow the ESC to force the EPA to update the information under such circumstances.

Referring back to the previous example related to the presence information, the Presence Server (i.e., the ESC) may have an agreed-upon one-hour expiration interval for the location information with the Presence Source (i.e., the EPA). In this example scenario, due the relatively long duration of the expiration interval, the probability of having outdated location information within the existing presence is high. According to the existing methods, the Presence Source may or may not refresh, modify or remove the location information before expiration of the one-hour interval. If the information is not updated, the location information simply expires. While the failure to update the information and/or expiration of the information may not be problematic for existing watchers that have been monitoring the location of the presentity, the Presence Server may find it necessary to send notifications regarding recent location information to newly subscribed watchers, or those watchers which are just refreshing their subscriptions in accordance with their local policies.

According to an example embodiment of the present invention, the Presence Server may utilize a mechanism that triggers the Presence Source to update the information. In response to such a trigger, the Presence Source may refresh the previous publication, modify it with new values or simply remove it. As such, the newly subscribed or re-subscribed watchers receive a recent value of the presentity's location instead of outdated values.

In one example embodiment, the ESC may use the SIP REFER method to trigger an update action. A REFER is a SIP extension, requesting that the recipient refer to a resource provided in the request. It provides a mechanism for allowing the party sending the REFER to be notified of the outcome of the referenced request. In accordance with an example embodiment of the present invention, the ESC may use the SIP REFER method to trigger the EPA to update a previous publication. To this end, the ESC may issue a REFER request, which in turn triggers the EPA to issue a non-initial PUBLISH, updating the previous publication. The update may be a refresh, modify or remove operation.

It should be noted that while a REFER request may automatically create an implicit subscription, this subscription may not be desired by the ESC. Accordingly, the ESC may opt to eliminate the implicit subscription that is associated with a REFER request. As such, in one example embodiment, the automatic establishment of an event subscription and subsequent notifications that are associated with a REFER request may be eliminated. This elimination, for example, may be carried out in accordance with the procedures described in document "Suppression of Session Initiation Protocol (SIP) REFER Method Implicit Subscription," (RFC4488).

In order to send the REFER request, the ESC needs to be aware of the EPA's contact address. In accordance with an example embodiment of the present invention, an EPA may include a Contact header field for every initial PUBLISH request. The EPA may be running on user agent with several SIP applications. The EPA needs to make sure that the incoming REFER request is correctly routed to the right EPA instance. In order to achieve this should use a Globally Routable User Agent URI as the value for the Contact header field. The mechanisms to reserve a Globally Routable User Agent URI are defined in draft-ietf-sip-gruu-15. The ESC may then use the SIP Uniform Resource Identifier (URI) from the Contact header field to populate the Request-URI of the REFER request. Alternatively, or additionally, the contact information may be saved from the topmost Via header field, and the ESC may then acquire the contact address from the topmost Via header to enable the sending of the REFER request. According to SIP, the Via header field indicates the transport used for the transaction and identifies the location where the response is to be sent. The EPA should also advertise that it is capable to process a REFER request. This is achieved by including an 'Allow:REFER' header field in every initial PUBLISH request.

Once an EPA receives a REFER request, it must determine whether or not the REFER request is designated to trigger an update of an existing publication. Furthermore, if the EPA is responsible for multiple publications, it also needs to determine which publication is requested to be updated. To this end, it may be possible to use Entity-Tags as a way to reference a particular state of publication. In accordance with an example embodiment of the present invention, a new header field that comprises the identification information associated with the particular requested publication may be included in the REFER request. In one example embodiment, a SIP-If-Match header field that includes an Entity-Tag referencing the requested publication may be included in the REFER request.

Figure 1:
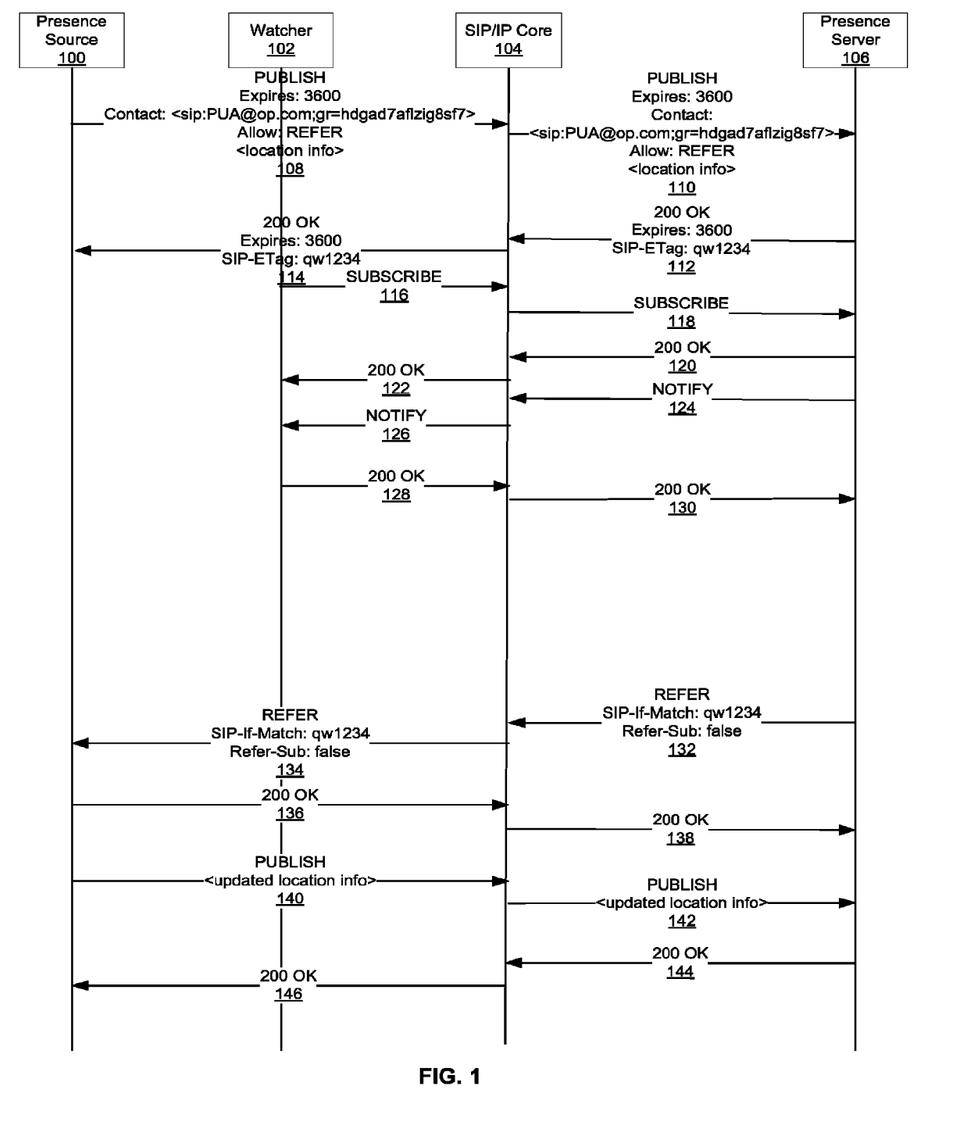
FIG. 1 is a flow diagram block diagram illustrating the republication of information in accordance with an example embodiment of the present invention.

An exemplary embodiment of the present invention may be illustrated using the OMA Session Initiation Protocol for Instant Messaging and Presence Leveraging Extensions (SIMPLE) Presence 2.0 service. FIG. 1 is an flow diagram that illustrates the various steps involved in obtaining updated location information in accordance with an example embodiment of the present invention. FIG. 1 illustrates a Presence Source 100 (i.e., an EPA) sending a PUBLISH 108, 110 request via the SIP/IP Core 104 to a Presence Server 106. The publication comprises information such as the expiration interval with and exemplary duration of 3600 seconds, an 'Allow:REFER' header field, as well as the location information as message payload. The initial PUBLISH 108, 110 request may include a Contact header field including a Globally Routable User Agent URI when the Presence Server 106 (i.e., the ESC) initiates a trigger mechanism to obtain updated presence information. After the initial PUBLISH 108, 110, the Presence Server 106 reserves an entity-tag for the presence information and sends acknowledgements 112, 114 to the Presence Source 100. As illustrated in FIG. 1, at some point before the end of expiration interval, say 2000 seconds into the expiration interval, a Watcher 102 may SUBSCRIBE 116, 118 for an Event of Notification from the Presence Server 106. Upon acknowledgment 120, 122 by the Presence Server 106, the Presence Server 106 may NOTIFY 124, 126 the Watcher 102, which may be followed by acknowledgement 128, 130 on the part of the Watcher 102.

In order to further illustrate the various embodiment of the present invention, the Presence Server 106 may be configured with a local policy that requires an update of the previously published presence information when a predefined condition is satisfied. According to an example embodiment of the present invention, such a condition may be satisfied upon the subscription of a new watcher and/or when a watcher refreshes its existing subscription. In one example embodiment, an update of the location information may be triggered if the published information has not been updated for at least 30 minutes and the publication is not expected to expire in the next five minutes. If all of the above conditions are met, the Presence Server may then initiate a mechanism, such as using the SIP REFER, to request an update of the location information. The above-described local policy at the ESC may be described using the following pseudo-code:

```
IF (Presence Information = Location Information) AND
IF (Publication Expiration Interval ≥ 1800 Seconds) AND
IF (Remaining Duration in Expiration Interval ≥ 360 Seconds)
    THEN Send REFER to Presence Source.
```

Referring back to FIG. 1, when the triggering condition is satisfied, the Presence Server 106 may issue a REFER 132, 134 request to the URI that may be present in the Contact header of the PUBLISH 108, 110 request or the topmost Via header field of the PUBLISH 108, 110 request. The REFER 132, 134 request may include a "Refer-Sub: false" header field and a SIP-If-Match header field with the same entity-tag that was specified in the initial PUBLISH 108, 110. Upon acknowledgment 136, 138 to the Presence Server 106, the Presence Source 100 may determine whether or not the entity-tag associated with the SIP-If-Match header field matches a previous publication. In case of a match, the Presence Source 100 may issues a new PUBLISH 140, 142 request to refresh, modify or remove the previous publication. The Presence Server 106 may then acknowledge 144, 146 the receipt of publication information.

Figure 2:
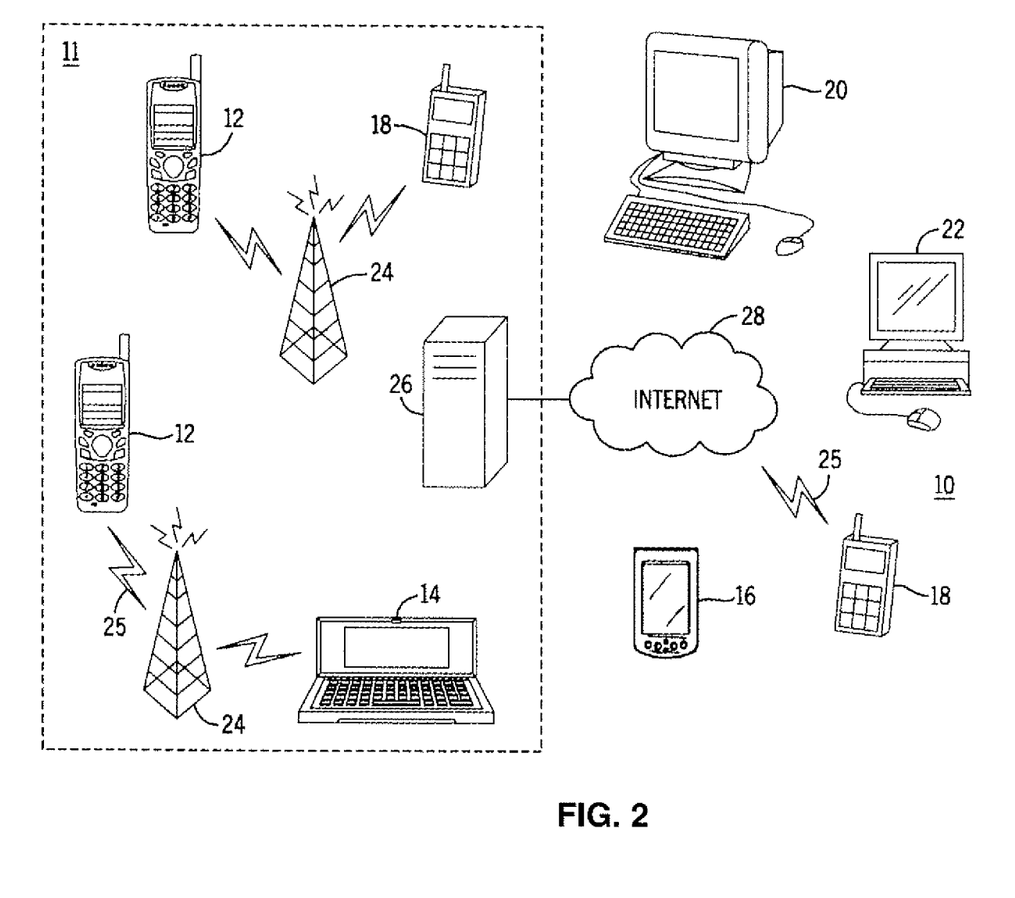
FIG. 2 is an overview diagram of a system within which various embodiments of the present invention may be implemented.

FIG. 2 shows a system 10 in which various embodiments of the present invention can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 2 includes a mobile telephone network 11 and the Internet 28. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a electronic device 12, a combination personal digital assistant (PDA( ) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the mobile telephone network 11 and the Internet 28. The system 10 may include additional communication devices and communication devices of different types.

The communication devices may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media including, but not limited to, radio, infrared, laser, cable connection, and the like.

Figure 3:
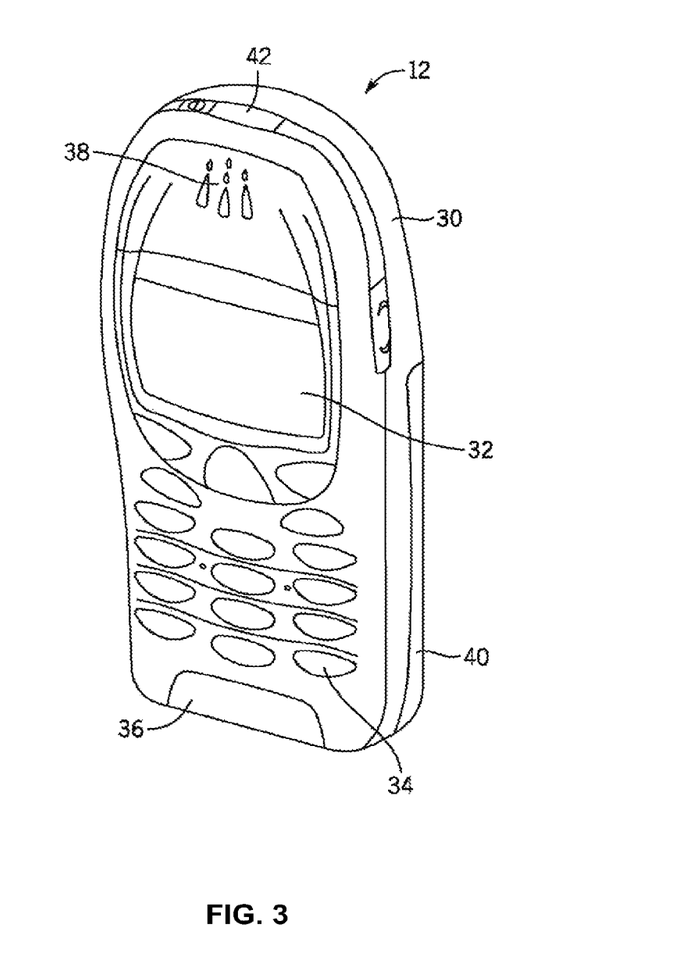
FIG. 3. illustrates a perspective view of an exemplary electronic device within which various embodiments of the present invention may be implemented.
Figure 4:
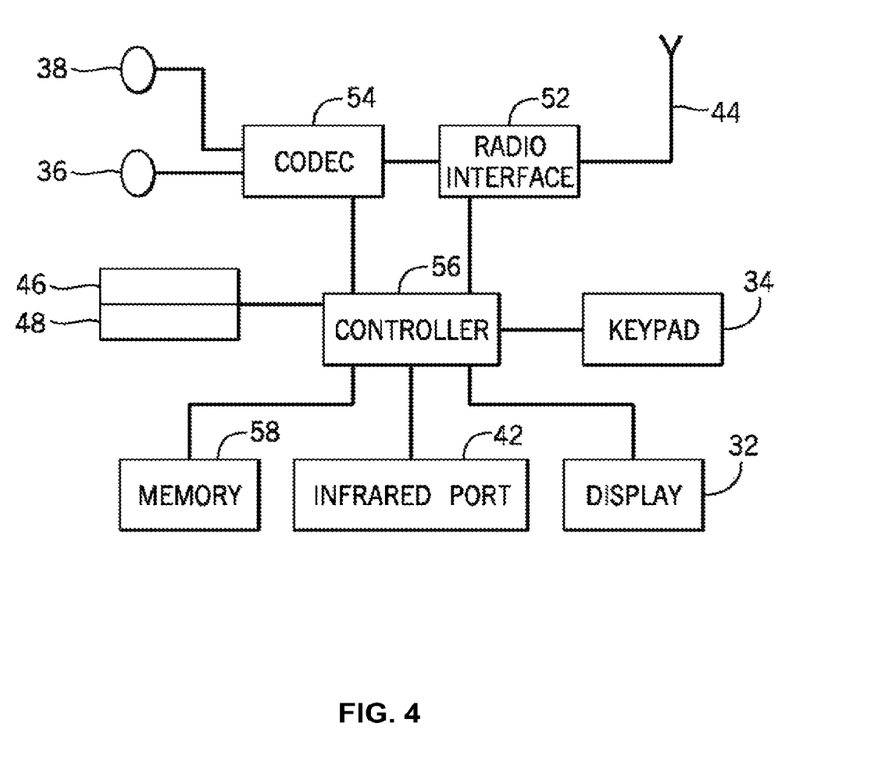
FIG. 4 illustrates an exemplary schematic representation of the circuitry which may be included in the electronic device of FIG. 3.

FIGS. 3 and 4 show one representative electronic device 12 within which embodiments of the present invention may be implemented. It should be understood, however, that the present invention is not intended to be limited to one particular type of device. The electronic device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art, for example in the Nokia range of mobile telephones.

The various embodiments described herein are described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
receiving an initial publication from an Event Publication Agent at an Event State Compositor, the publication comprising an expiration interval;
sending a republication request to the Event Publication Agent prior to expiration of the expiration interval; and
receiving an updated information from the Event Publication Agent in response to the republication request,
wherein the republication request is carried out in accordance with a Session Internet Protocol REFER request, and
wherein the REFER request includes a "Refer-Sub: false" header field and a SIP-IF-Match header field with a same entity-tag specified in the initial publication.

2. The method of claim 1, wherein the initial publication information comprises a contact information associated with the Event Publication Agent.

3. The method of claim 2, wherein the contact information is located within at least one of a Contact header field or a Via header field.

4. The method of claim 2, wherein the Contact header field includes a Globally Routable User Agent Uniform Resource Identifier (GRUU).

5. The method of claim 1, wherein the sending is triggered in accordance with a predefined condition.

6. The method of claim 5, wherein the predefined condition comprises at least one of an addition of a new Watcher or a refreshing of a subscription of an existing Watcher.

7. The method of claim 1, wherein the Event Publication Agent is a mobile device.

8. A method, comprising:
sending an initial publication from an Event Publication Agent to one or more Event State Compositors, the publication comprising an expiration interval;
receiving a republication request from at least one Event State Compositor prior to expiration of the expiration interval; and
sending an updated information to the Event State Compositor in response to the republication request,
wherein the republication request is carried out in accordance with a Session Internet Protocol REFER request, and
wherein the REFER request includes a "Refer-Sub: false" header field and a SIP-IF-Match header field with a same entity-tag specified in the initial publication.

9. The method of claim 8, wherein the initial publication information comprises a contact information associated with the Event Publication Agent.

10. The method of claim 9, wherein the contact information is located within at least one of a Contact header field or a Via header field.

11. The method of claim 9, wherein the Contact header field includes a Globally Routable User Agent Uniform Resource Identifier (GRUU).

12. The method of claim 8, wherein the sending is triggered in accordance with a predefined condition.

13. The method of claim 12, wherein the predefined condition comprises at least one of an addition of a new Watcher or a refreshing of a subscription of an existing Watcher.

14. The method of claim 8, wherein the Event Publication Agent is a mobile device.

15. An apparatus, comprising:
a receiver configured to receive an initial publication from an Event Publication Agent at an Event State Compositor, the publication comprising an expiration interval; and
a transmitter configured to send a republication request to the Event Publication Agent prior to expiration of the expiration interval,
wherein the receiver is further adapted to receive an updated information from the Event Publication Agent in response to the republication request,
wherein the republication request is carried out in accordance with a Session Internet Protocol REFER request, and
wherein the REFER request includes a "Refer-Sub: false" header field and a SIP-IF-Match header field with a same entity-tag specified in the initial publication.

16. The apparatus of claim 15, wherein the initial publication information comprises a contact information associated with the Event Publication Agent.

17. The apparatus of claim 16, wherein the contact information is located within at least one of a Contact header field or a Via header field.

18. The apparatus of claim 16, wherein the Contact header field includes a Globally Routable User Agent Uniform Resource Identifier (GRUU).

19. The apparatus of claim 15, wherein the sending is triggered in accordance with a predefined condition.

20. The apparatus of claim 19, wherein the predefined condition comprises at least one of an addition of a new Watcher or a refreshing of a subscription of an existing Watcher.

* * * * *